(12) United States Patent
Wittlinger et al.

(10) Patent No.: US 11,746,846 B2
(45) Date of Patent: Sep. 5, 2023

(54) SLACK ADJUSTER ASSEMBLY FOR DRUM BRAKING SYSTEMS

(71) Applicant: Hendrickson USA, L.L.C., Schaumburg, IL (US)

(72) Inventors: Jeffrey R. Wittlinger, Uniontown, OH (US); Jay D. White, North Canton, OH (US); Dhawal P. Dharaiya, Twinsburg, OH (US); David L. Schaeffer, Louisville, OH (US); Wyatt R. Weekley, Lincoln, NE (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 101 days.

(21) Appl. No.: 17/399,144

(22) Filed: Aug. 11, 2021

(65) Prior Publication Data
US 2022/0065317 A1   Mar. 3, 2022

Related U.S. Application Data

(60) Provisional application No. 63/071,455, filed on Aug. 28, 2020.

(51) Int. Cl.
*F16D 65/52*   (2006.01)
(52) U.S. Cl.
CPC .................... *F16D 65/52* (2013.01)
(58) Field of Classification Search
CPC .. F16D 2121/14; F16D 2125/36; F16D 65/54; F16D 65/52; F16D 2125/32;
(Continued)

(56) References Cited

U.S. PATENT DOCUMENTS 3,008,344 A * 11/1961 Dracka ................. G05G 23/00
                                                    74/522
3,871,495 A *  3/1975 Devitt ..................... F16D 65/60
                                                  188/79.55
(Continued)

FOREIGN PATENT DOCUMENTS

EP        0931224       7/1999
WO     2014150551       9/2014

OTHER PUBLICATIONS

EP 0139116 B1 (Year: 1988).*
EP 2944842 A1 (Year: 2015).*

*Primary Examiner* — Nicholas J Lane
*Assistant Examiner* — Mahbubur Rashid
(74) *Attorney, Agent, or Firm* — Dureska & Moore, LLC; David P. Dureska; Benjamin J. Chojnacki

(57) ABSTRACT

A slack adjuster assembly for use with a heavy-duty vehicle drum brake system, the slack adjuster assembly comprising a slack adjuster, a cam tube assembly, and an interlock assembly. The interlock assembly is disposed on an outboard side of the slack adjuster and interconnects the cam tube assembly with the slack adjuster. A component of the interlock assembly and a component of the cam tube assembly cooperate to form a rotation reference mechanism for indexing of an automatic adjustment mechanism of the slack adjuster. The slack adjuster assembly further comprising an inboard sealing assembly and an outboard sealing assembly engaging respective inboard and outboard sides of the slack adjuster to form respective 360-degree interfaces. The cam tube assembly, interlock assembly, and inboard and outboard sealing assemblies forming a continuous grease pathway between the cam tube assembly and the slack adjuster.

21 Claims, 10 Drawing Sheets

(58) Field of Classification Search
CPC .. F16D 65/568; F16D 2127/06; F16D 65/546; F16D 65/14; F16D 2127/10; F16D 2125/28; F16D 2121/22; F16D 13/757; F16D 2125/52; F16D 2125/64; F16D 49/00; F16D 65/563; F16D 25/126; F16D 13/75; F16D 13/752; F16D 65/44; B60T 7/108; B61H 15/00
See application file for complete search history.

(56) References Cited

U.S. PATENT DOCUMENTS

| | | | |
|---|---|---|---|
| 3,997,036 A | 12/1976 | Zeidler | |
| 4,114,733 A | 9/1978 | Knight | |
| 4,380,276 A | 4/1983 | Sweet et al. | |
| 4,440,268 A * | 4/1984 | Karlsson | F16D 65/60 192/111.12 |
| 4,499,978 A * | 2/1985 | Norcross | F16D 65/50 188/79.55 |
| 4,825,979 A * | 5/1989 | Svensson | F16D 65/60 188/196 D |
| 4,838,389 A | 6/1989 | Mamery | |
| 5,350,043 A | 9/1994 | Crewson et al. | |
| 5,477,945 A * | 12/1995 | Klass | F16D 65/22 188/79.51 |
| 6,240,806 B1 | 6/2001 | Morris et al. | |
| 6,378,658 B1 * | 4/2002 | Kay | F16D 65/00 188/264 B |
| 6,450,302 B1 | 9/2002 | Lyons | |
| 6,622,828 B1 * | 9/2003 | DeLeeuw | F16D 65/22 384/275 |
| 7,040,465 B2 * | 5/2006 | Jones | F16D 51/00 188/79.55 |
| 7,537,224 B2 | 5/2009 | Morris et al. | |
| 7,819,231 B2 * | 10/2010 | Gibson, Jr. | F16C 33/102 403/365 |
| 8,302,744 B2 * | 11/2012 | Louis | F16D 65/60 188/196 R |
| 8,387,926 B2 * | 3/2013 | Runels | F16L 3/18 248/62 |
| 8,696,208 B1 * | 4/2014 | Everline | F16D 65/22 384/129 |
| 8,800,728 B2 | 8/2014 | Dharaiya | |
| 9,376,098 B2 * | 6/2016 | Eveley | B60T 17/088 |
| 9,580,057 B2 * | 2/2017 | Pierce | B60T 17/088 |
| 10,240,652 B2 * | 3/2019 | Root | F16D 65/60 188/79.55 |
| 10,527,119 B2 * | 1/2020 | Drake | B60T 17/088 |
| 2007/0140782 A1 * | 6/2007 | Morris | F16D 65/28 74/567 |
| 2010/0018812 A1 * | 1/2010 | Louis | F16D 65/60 188/196 D |
| 2012/0080573 A1 * | 4/2012 | Fulton | B60T 1/067 29/428 |
| 2020/0362930 A1 * | 11/2020 | Deshpande | F16D 65/60 188/196 D |

\* cited by examiner

SLACK ADJUSTER ASSEMBLY FOR DRUM BRAKING SYSTEMS

CROSS-REFERENCE TO RELATED APPLICATION

This application claims the benefit of U.S. Provisional Patent Application No. 63/071,455, filed Aug. 28, 2020.

BACKGROUND OF THE INVENTION

Field of the Invention

The present invention relates generally to the art of braking systems for heavy-duty vehicles. In particular, the present invention relates to braking systems for heavy-duty vehicles that utilize drum brakes. More particularly, the present invention is directed to a slack adjuster assembly for a heavy-duty vehicle braking system that has a more robust rotation reference mechanism, allows for 360° sealing of the inboard and outboard sides of the slack adjuster, and creates a continuous pathway between a cam tube grease chamber and the slack adjuster to improve lubrication of the splines of the camshaft, thereby increasing the service life and maintenance interval of the braking system.

Background Art

The use of braking systems on heavy-duty vehicles is well known. For the purposes of clarity and convenience, reference is made to a heavy-duty vehicle with the understanding that such reference includes trucks, tractor-trailers or semi-trailers, trailers, and the like. Common types of braking systems for heavy-duty vehicles typically include disc brake systems and drum brake systems.

Drum brake systems are generally incorporated into an axle/suspension system. Drum brake systems typically include a brake drum mounted on a wheel hub of a wheel end assembly rotatably mounted on an outboard end of the axle. The brake drum typically includes a pair of brake shoes housed within the brake drum. Each brake shoe has a sacrificial, high coefficient of friction brake lining that is mounted on a metal backing plate, or shoe table, and maintained in a radially-spaced relationship from the interior braking surface of the brake drum. An S-cam attached to the outboard end of a camshaft of a cam shaft assembly of the drum brake system engages a pair of rollers, each roller being connected to an end of a respective brake shoe.

Drum brake systems also include a prior art slack adjuster assembly. Prior art slack adjuster assemblies typically include a slack adjuster attached to the inboard splined end of the camshaft. The slack adjuster establishes a rotation reference point for an automatic adjustment mechanism. In particular, the prior art slack adjuster assembly typically includes a control arm operatively connected to the axle/suspension system by a reference reaction pin in order to establish the rotation reference point, as is known. More particularly, the automatic adjustment mechanism of the prior art slack adjuster assembly indexes the camshaft rotation from the rotation reference point in order to maintain a preset distance or clearance between the brake lining of the brake shoes and the interior braking surface of the brake drum. Thus, the automatic adjustment mechanism regulates the stroke and mechanical force necessary to engage the brake linings against the brake drum to slow or stop the heavy-duty vehicle.

When an operator of the heavy-duty vehicle applies the vehicle brakes, compressed air is communicated from an air supply source, such as a compressor and/or air tank, through air conduits or lines to a brake chamber, as is known. The brake chamber converts the air pressure into mechanical force and moves a pushrod. The pushrod, in turn, moves the slack adjuster of the prior art slack adjuster assembly, which causes rotation of the camshaft and S-cam, forcing the brake linings against the interior braking surface of the brake drum, thereby creating friction and slowing or stopping the heavy-duty vehicle. The prior art slack adjuster assembly indexes the rotation of the camshaft when the operator applies the brakes. Once the operator of the heavy-duty vehicle releases the brakes, the camshaft, and thus the S-cam, rotate back, allowing the radially-spaced relationship between the brake lining and interior braking surface of the brake drums to be re-established. The slack adjuster rotates back to a new position based on the indexed rotation of the cam shaft, thereby maintaining the preset distance or clearance between the brake lining and the interior braking surface of the brake drum.

Prior art slack adjuster assemblies, while adequate for the intended purpose, have potential disadvantages, drawbacks, and limitations. For example, prior art slack adjuster assemblies are typically unsealed along the inboard side of the slack adjuster that operatively receives and engages the camshaft. As a result, moisture, corrosive agents, and/or debris can potentially infiltrate between the slack adjuster and camshaft, causing corrosion and rust-locking of the intermeshed spline teeth and/or other components, thereby increasing braking system maintenance and heavy-duty vehicle downtime. Prior art sealing structures, such as boots, faceplates, and the like, have not optimally addressed the problem on slack adjusters, particularly prior art slack adjuster assemblies of the type having reference reaction pin mounted control arms. In addition, during heavy-duty vehicle operation, vibration of the axle/suspension system may potentially cause wear between the control arm and reference reaction pin. Wear between the control arm and reference reaction pin may potentially allow additional rotation of the automatic adjustment mechanism of the slack adjuster. As a result, the prior art slack adjuster assemblies may not properly index the camshaft rotation, potentially leading to increased stroke and mechanical force being required to engage the linings against the brake drum, thereby reducing the effectiveness of the braking system.

Thus, there is a need in the art for an improved slack adjuster assembly that provides a more robust rotation reference mechanism and a 360° seal of the inboard and outboard sides of the slack adjuster that allows for improved lubrication of the splined connection between the camshaft and the slack adjuster and prevents infiltration of water, contaminants, and other debris.

SUMMARY OF THE INVENTION

Objectives of the present invention include providing a slack adjuster assembly having a more robust rotation reference mechanism.

A further objective of the present invention is to provide a slack adjuster assembly having a 360-degree seal about the inboard and outboard sides of the slack adjuster.

Yet another objective of the present invention is to provide a slack adjuster assembly having a continuous grease pathway between a cam tube grease chamber and the slack adjuster for lubricating the splines of the camshaft.

These objectives and advantages are obtained by the slack adjuster assembly for use with a heavy-duty vehicle drum brake system, the slack adjuster assembly comprising a slack adjuster, a cam tube assembly, and an interlock assembly. The interlock assembly is disposed on an outboard side of the slack adjuster and interconnects the cam tube assembly with the slack adjuster. A component of the interlock assembly and a component of the cam tube assembly cooperate to form a rotation reference mechanism for indexing of an automatic adjustment mechanism of the slack adjuster.

BRIEF DESCRIPTION OF THE SEVERAL VIEWS OF THE DRAWINGS

The exemplary embodiments of the present invention, illustrative of the best mode in which Applicant has contemplated applying the principles, is set forth in the following description, is shown in the drawings, and is particularly and distinctly pointed out and set forth in the appended claims.

Similar reference characters refer to similar parts throughout.

DESCRIPTION OF THE PREFERRED EMBODIMENT

Figure 1:
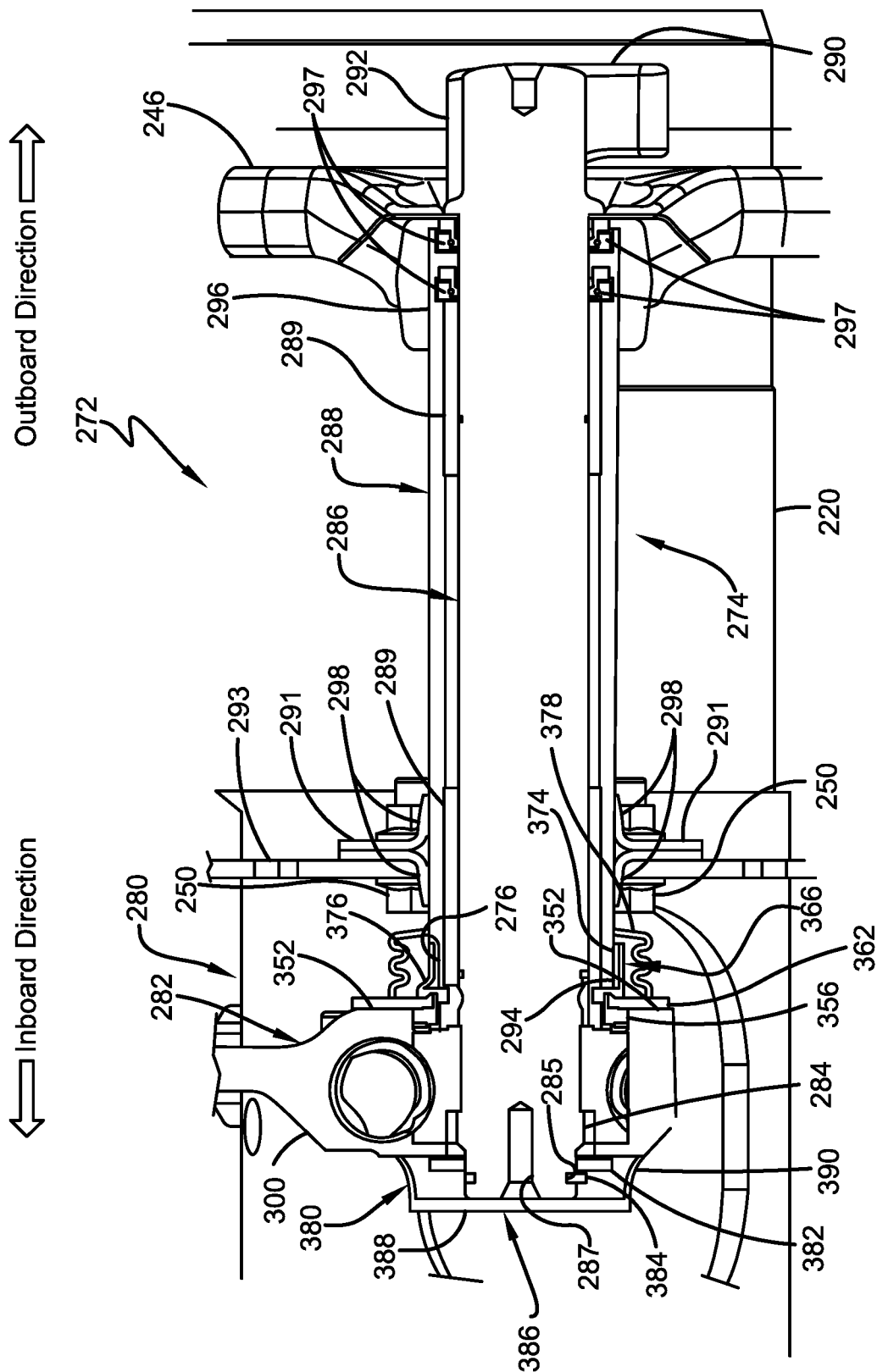
FIG. 1 is a fragmentary elevational view, partially in section, of an exemplary embodiment slack adjuster assembly, according to the present invention, incorporated into a braking system.

An exemplary embodiment slack adjuster assembly 280 (FIGS. 1-2), according to the present invention, may be incorporated into a braking system 272 (partially shown). Slack adjuster assembly 280 includes a slack adjuster 282 having a body 300 that is operatively connected to a pushrod (not shown) extending from an air brake chamber (not shown), as is known. Slack adjuster 282 is mounted on and engages an inboard splined end 284 of a camshaft 286. Camshaft 286 is rotatably mounted within, and extends through, a cam tube 288 of a cam tube assembly 274 by a set of bushings 289. An outboard end 292 of the camshaft 286 extends outward from cam tube 288 to enable an S-cam 290 to engage brake shoes or linings (not shown), as is known.

Cam tube 288 is mounted parallel to an axle 220 of a heavy-duty vehicle (not shown) by a cam tube bracket 291 and a brake spider 246. More specifically, cam tube bracket 291 is mounted using any suitable means, such as fasteners 250, on a beam sidewall 293 but, alternatively, may be mounted on a separate bracket attached to axle 220. An inboard end 294 of cam tube 288 is disposed through cam tube bracket 291, which applies a clamping force to the cam tube using a plurality of tabs 298 as fasteners 250 are tightened, anchoring and preventing rotation or slippage of the cam tube. In addition, an outboard end 296 of cam tube 288 is disposed through brake spider 246, which is mounted on the outboard end of axle 220.

Figure 2:
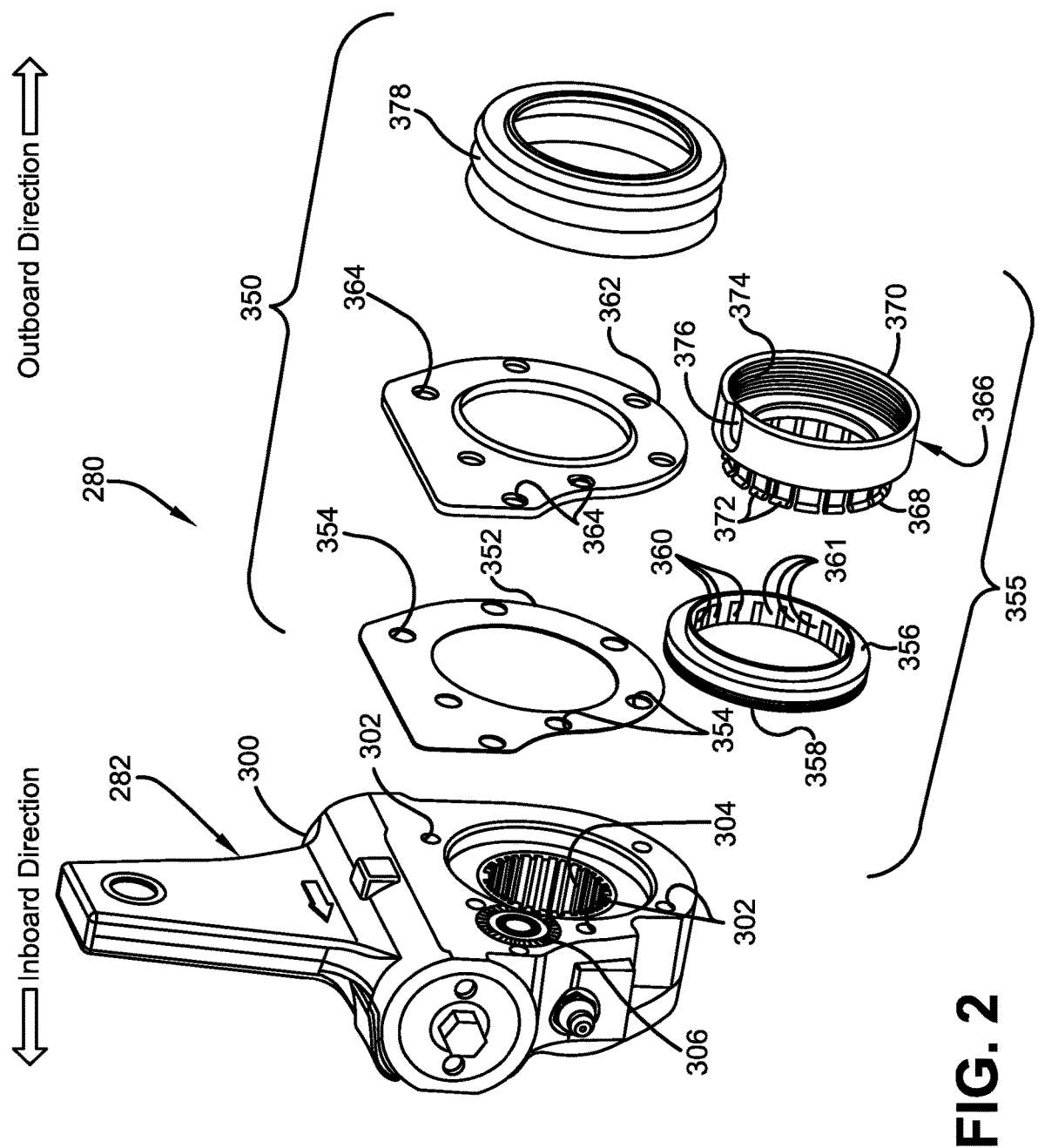
FIG. 2 is an exploded perspective view of a portion of the slack adjuster assembly shown in FIG. 1, showing the slack adjuster, the interlock assembly, and the outboard sealing assembly.
Figure 3:
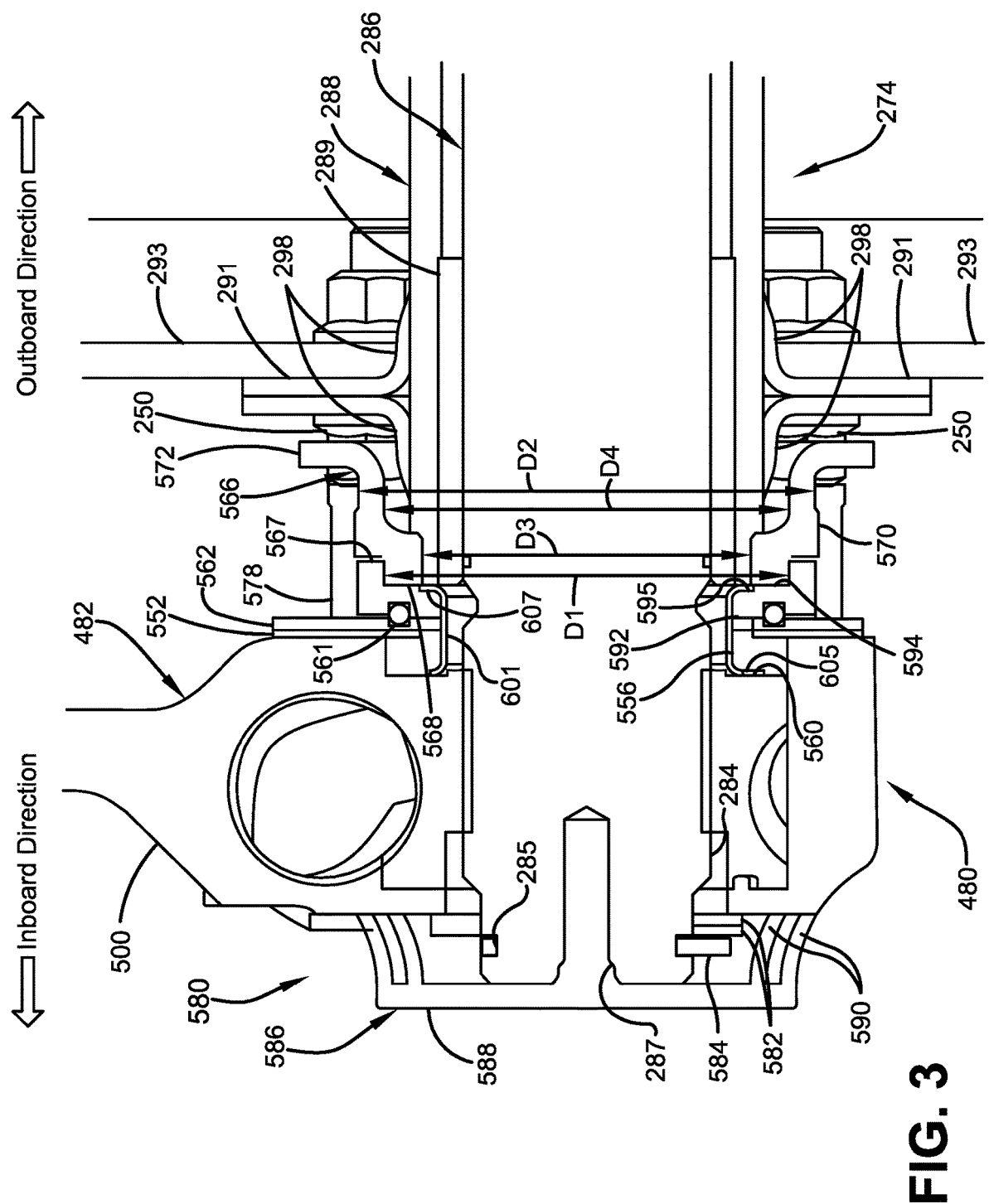
FIG. 3 is a fragmentary elevational view, in section, of another exemplary embodiment slack adjuster assembly, according to the present invention.

In accordance with an important aspect of the invention, slack adjuster assembly 280 also includes an outboard sealing assembly 350 (FIG. 2), an interlock assembly 355 (FIG. 2), and an inboard sealing assembly 380. With particular reference to FIG. 2, outboard sealing assembly 350 includes a seal 352 and a cover plate 362. Seal 352 may be formed from any suitable material, but more preferably is formed from a polymer, such as Mylar. Seal 352 may have an adhesive coating on one or both of the inboard and outboard sides of the seal to attach the seal to body 300 of slack adjuster 282 and cover plate 362, respectively. Cover plate 362 may be formed from any suitable material, such as metal, by any suitable method. Body 300, seal 352, and cover plate 362 each have a respective plurality of aligned openings 302, 354, 364 for receiving a respective number of fasteners (not shown) to attach the cover plate to the body and form a watertight seal therebetween.

Outboard sealing assembly 350 also includes a flexible boot 378. Boot 378 is formed from any suitable material, such as an elastomer, and extends between cover plate 362 and cam tube 288. In particular, boot 378 forms an interface with or sealingly engages at least a portion of cover plate 362 using any suitable means, such as an integrally molded connection, adhesive, and/or a friction fit connection, to provide an additional 360° seal and prevent infiltration of water, corrosive agents, and debris into slack adjuster 282. Specifically, boot 378 may be slidingly and sealingly disposed about cam tube 288 and integrally molded onto cover plate 362 such that openings 364 are disposed within the boot.

In accordance with another important aspect of the present invention, interlock assembly 355 interconnects cam tube 288 with slack adjuster 282, allowing the cam tube to provide a relatively more robust rotation reference apparatus for an automatic adjustment mechanism (not shown) of the slack adjuster than prior art slack adjuster assemblies, such as those employing reference reaction pin mounted control arms. In particular, interlock assembly 355 includes a control ring 356. More particularly, control ring 356 has an inboard portion 358, which includes a fine control gear (not shown) formed in the outer diameter of the inboard portion. Alternatively, inboard portion 358 of control ring 356 may have any other suitable feature, such as a slot or notch or a pawl, as is known. Control ring 356 also includes a plurality of teeth 360 disposed about an inner surface of the control ring in a circumferentially-spaced arrangement such that the teeth are separated by a corresponding plurality of gaps 361. Control ring 356 is at least partially disposed within body 300 of slack adjuster 282 and is retained by cover plate 362. As a result, the control gear of inboard portion 358 operatively engages a regulator pinion 306 within body 300. Alternatively, inboard portion 358, having a slot, notch, or pawl, may operatively engage any other suitable mechanism or interface of slack adjuster 282, such as a rack and pinion assembly or a ratchet wheel, as is known. Thus, control ring 356 cooperates with the suitable mechanism or interface to operate the automatic adjustment mechanism of slack adjuster 282.

In addition, interlock assembly 355 includes a generally tubular anchor ring 366. Anchor ring 366 has an inboard portion 368 and an outboard portion 370. Inboard portion 368 includes a plurality of tabs 372 formed on its external surface in a circumferentially-spaced arrangement. Tabs 372 correspond to gaps 361 formed between teeth 360 on the internal surface of control ring 356. More particularly, inboard portion 368 of anchor ring 366 is slidingly disposed within control ring 356, such that tabs 372 fit between, or interlock with, and operatively engage teeth 360 of the control ring. Outboard portion 370 of anchor ring 366 includes an inner surface 374. Surface 374 operatively engages the outer surface of cam tube 288 to provide a watertight seal and prevent infiltration of corrosive agents and debris. It is also contemplated that surface 374 may be lined with any suitable material, such as rubber, or may be chemically or mechanically coated or treated in order to provide a friction seal between the surface and cam tube 288 that prevents relative rotational movement between the cam tube and anchor ring 366.

Anchor ring 366 may also include a recess or dimple 376 formed in the outer surface of outboard portion 370 extending radially inward from the outer surface into and deforming or projecting from inner surface 374. Dimple 376 mechanically engages cam tube 288. More particularly, cam tube 288 may include a corresponding recess or dimple 276 (FIG. 1) that matingly receives and engages dimple 376 of outboard portion 370 of anchor ring 366. Mechanical engagement between dimples 276, 376 provides a more secure connection and prevents relative rotation between cam tube 288 and anchor ring 366, respectively. As a result, anchor ring 366 allows cam tube 288 to act as a non-rotating anchor for control ring 356, which is important for proper operation of the automatic adjustment mechanism of slack adjuster 282. More specifically, the connection between anchor ring 366 and cam tube 288, including dimples 276, 376, prevents vibration of the heavy-duty vehicle during operation from causing improper indexing of the rotation of cam shaft 286. Thus, anchor ring 366, cam tube 288, and dimples 376, 276, respectively, provide a relatively more robust rotation reference mechanism than prior art slack adjuster assemblies, such as those employing reference reaction pin mounted control arms.

In accordance with yet another important aspect of the present invention, interlock assembly 355 and outboard sealing assembly 350 cooperate to operatively connect cam tube 288 to slack adjuster 282 to form a continuous pathway for lubrication of inboard splined end 284 of camshaft 286. In particular, the connections between cam tube 288, anchor ring 366, control ring 356, and cover plate 362 described above form a continuous pathway that allows grease from the cam tube to move between the cam tube and slack adjuster 282 while preventing loss of grease to the environment. Boot 378 is also disposed about control ring 356, anchor ring 366, and at least a portion of cam tube 288 to prevent loss of grease and infiltration of water, corrosive agents, and debris into slack adjuster 282 and cam tube 288. Thus, cam tube 288 and slack adjuster assembly 280 form a continuous grease chamber or pathway between the cam tube and internal components of slack adjuster 282 that maintains a reservoir for lubricating inboard splined end 284 of camshaft 286.

In accordance with still another important aspect of the present invention, inboard sealing assembly 380 includes one or more washers 382 (FIG. 1) (only one shown) disposed about inboard splined end 284 of camshaft 286. Washers 382 may be formed from any suitable material, such as steel, and disposed such that the washers are in contact with, and may be operatively connected to, the inboard side of body 300 of slack adjuster 282. Washers 382 may have varying thicknesses to account for variability in dimensions of other components disposed inboardly of outboard end 292 of camshaft 286. Washers 382 limit axial movement of camshaft 286 to less than about 0.060 inches (0.15 cm), more preferably between about 0.010 in. (0.025 cm) to about 0.045 in. (0.11 cm), reducing wear on, and increasing the service life of, bearings 289 and cam tube seals 297 of cam tube assembly 274. It is also contemplated that washers 382 may be formed with one or more notches extending radially-outward from the inner diameter in order to facilitate the passage of grease through the washer. A retention ring 384 operatively engages a groove 285 formed in the inboard splined end 284 of camshaft 286 to secure the camshaft in slack adjuster 282 and prevent outboard movement of the camshaft and, in turn, the splines of the camshaft from disengaging splines of a worm wheel 304 (FIG. 2) of the slack adjuster. Retention ring 384 may also retain washers 382 against body 300 about camshaft 286. Alternatively, washers 382 may capture or retain an inboard cover plate (not shown), similar to cover plate 362, against body 300.

Inboard sealing assembly 380 also includes an outer cap 386. Cap 386 may be formed from any suitable material or combination of materials, such as rubber or metal. In particular, cap 386 may include a metal or composite plate 388 attached using any suitable means to one or more conical or frustoconical rings or gaskets 390 (only one shown) extending from the plate. Cap 386 may be attached to slack adjuster 282 or camshaft 286 using any suitable means. More preferably, cap 386 includes an opening (not shown) in plate 388. The opening aligns with a corresponding opening 287 formed in the inboard splined end 284 of camshaft 286. A fastener (not shown) is passed through the opening in plate 388 and is received in opening 287 of inboard splined end 284, thereby securing cap 386 to camshaft 286. Gasket 390 generally forms an interface with the inboard side of body 300, or, alternatively, the inboard cover plate, of slack adjuster 282. More particularly, gasket 390 may abut, engage with, or be attached to the inboard side of body 300, or, alternatively, the inboard cover plate, of slack adjuster 282 by any suitable means, such as adhesive.

During assembly, camshaft 286 may be disposed through brake spider 246, beam sidewall 293, and cam tube bracket 291 such that S-cam 290 is disposed outboardly of the brake spider. Cam tube 288 may then be disposed over camshaft 286. Control ring 356 of interlock assembly 355 and seal 352 and cover plate 362 of outboard sealing assembly 350 may then be installed or attached to body 300 of slack adjuster 282. Anchor ring 366 and boot 378 may then be disposed about camshaft 286 such that the anchor ring engages cam tube 288. Slack adjuster 282 may then be disposed about and operatively engage the inboard splined end 284 of camshaft 286. Boot 378 may then be slid inboardly into position against body 300 of slack adjuster 282 or cover plate 362 to be attached to or mechanically engage the body or cover plate and create a 360° sealing structure on the outboard side of the slack adjuster. Inboard sealing assembly 380 may then be installed on and over the inboard splined end 284 of camshaft 286, creating a 360° sealing structure on the inboard side of the slack adjuster. Grease may then be forced into cam tube 288 through a port (not shown) on the cam tube, filling the cam tube, slack adjuster 282, and inboard sealing assembly 380, such that excess grease purges from the interface between the inboard sealing assembly and body 300 of the slack adjuster. Thus, the continuous grease pathway, or encapsulation, formed between cam tube 288 and slack adjuster 282, in addition to interlock assembly 355 and outboard and inboard sealing assemblies 350, 380, respectively, prevent infiltration of water, corroding agents, and debris into the splines of camshaft 286 and the slack adjuster, retention ring 384, washer 382, as well as bearings 289 of the cam tube. As a result, slack adjuster 282 requires less maintenance and has an extended service life.

Thus, slack adjuster assembly 280, according to the present invention, provides a rotation reference mechanism that is relatively more robust than prior art slack adjuster assemblies, such as those employing reference reaction pin mounted control arms, by providing interlock assembly 355 utilizing the connection between anchor ring 366 and cam tube 288 with respective dimples 376, 276 to prevent vibration of the heavy-duty vehicle from causing improper indexing of the rotation of cam shaft 286 during operation of the heavy-duty vehicle. Moreover, inboard and outboard sealing assemblies 380, 350, respectively, provide a 360° seal on the respective inboard and outboard sides of slack adjuster 282 and create a continuous pathway between cam tube 288 and the slack adjuster for lubricating the splines of inboard splined end 284 of camshaft 286 and worm gear 304 as well as bearings 289. Slack adjuster assembly 280 thus prevents fretting and wear of washer 382, and seals 297 and bearings 289 of cam tube assembly 274, thereby increasing the maintenance interval and service life of slack adjuster 282 and reducing heavy-duty vehicle down time.

Another exemplary embodiment slack adjuster assembly 480 (FIGS. 3-10), according to the present invention, may be incorporated into the braking system 272 (FIG. 1) (partially shown), described above. Slack adjuster assembly 480 includes a slack adjuster 482 having a body 500 that is mounted on and engages inboard splined end 284 of camshaft 286.

Figure 4:
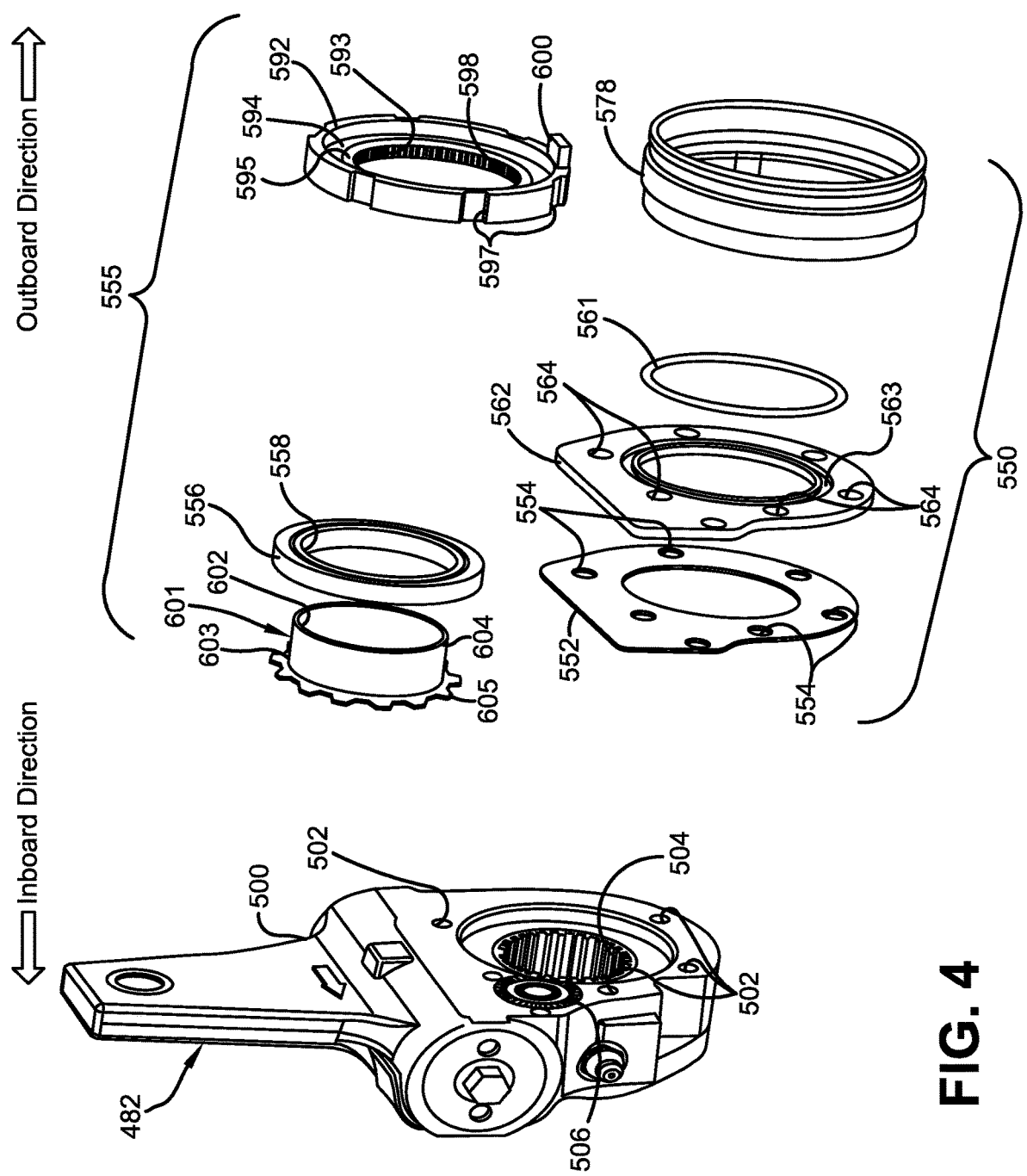
FIG. 4 is an exploded perspective view of a portion of the slack adjuster assembly shown in FIG. 3, showing the slack adjuster, components of the interlock assembly, and the outboard sealing assembly.
Figure 5:
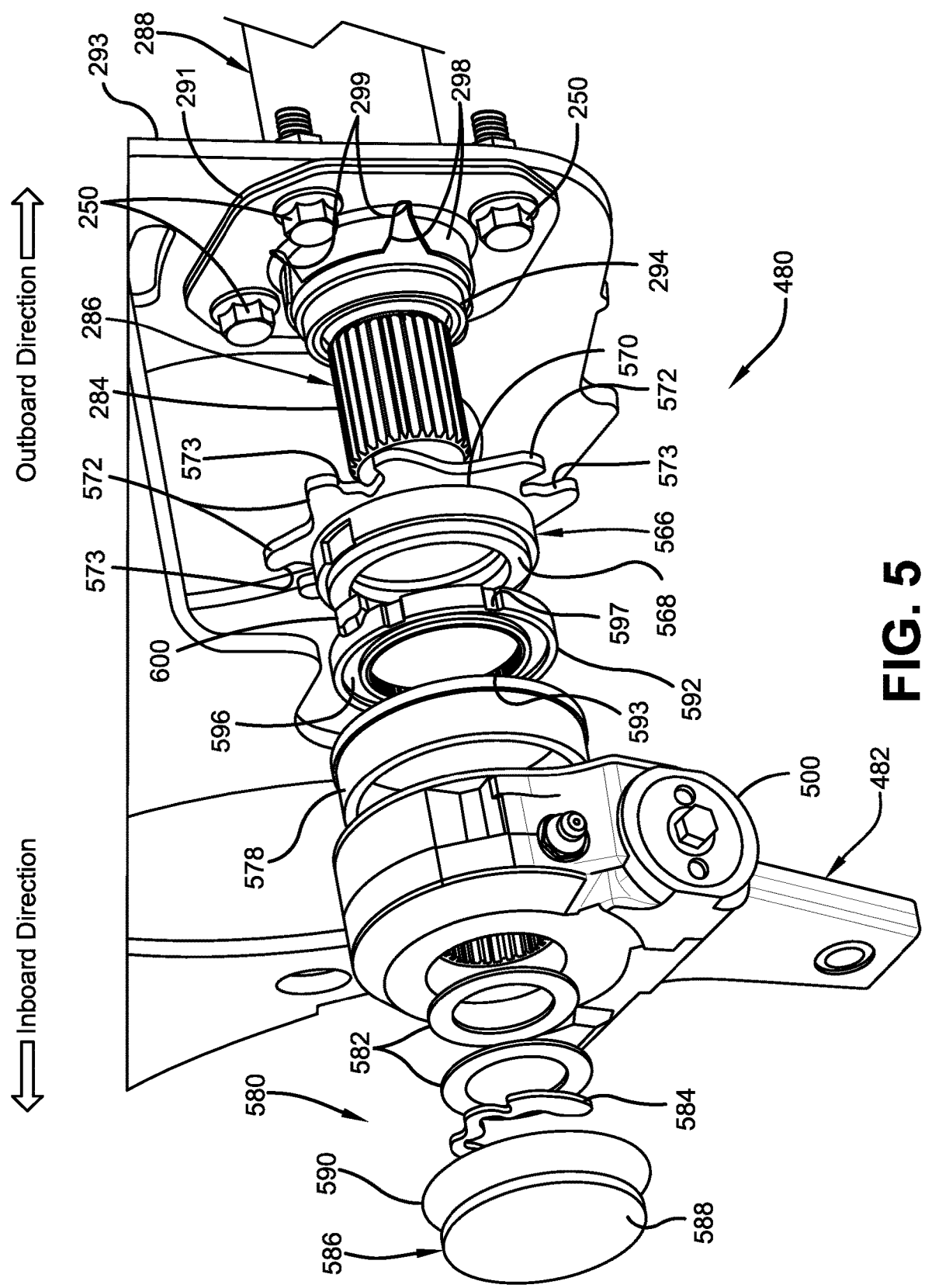
FIG. 5 is an exploded fragmentary perspective view of a portion of the slack adjuster assembly shown in FIGS. 3-4, showing the inboard sealing assembly, slack adjuster, components of the interlock assembly, and the outboard sealing assembly integrated into the braking system.
Figure 6:
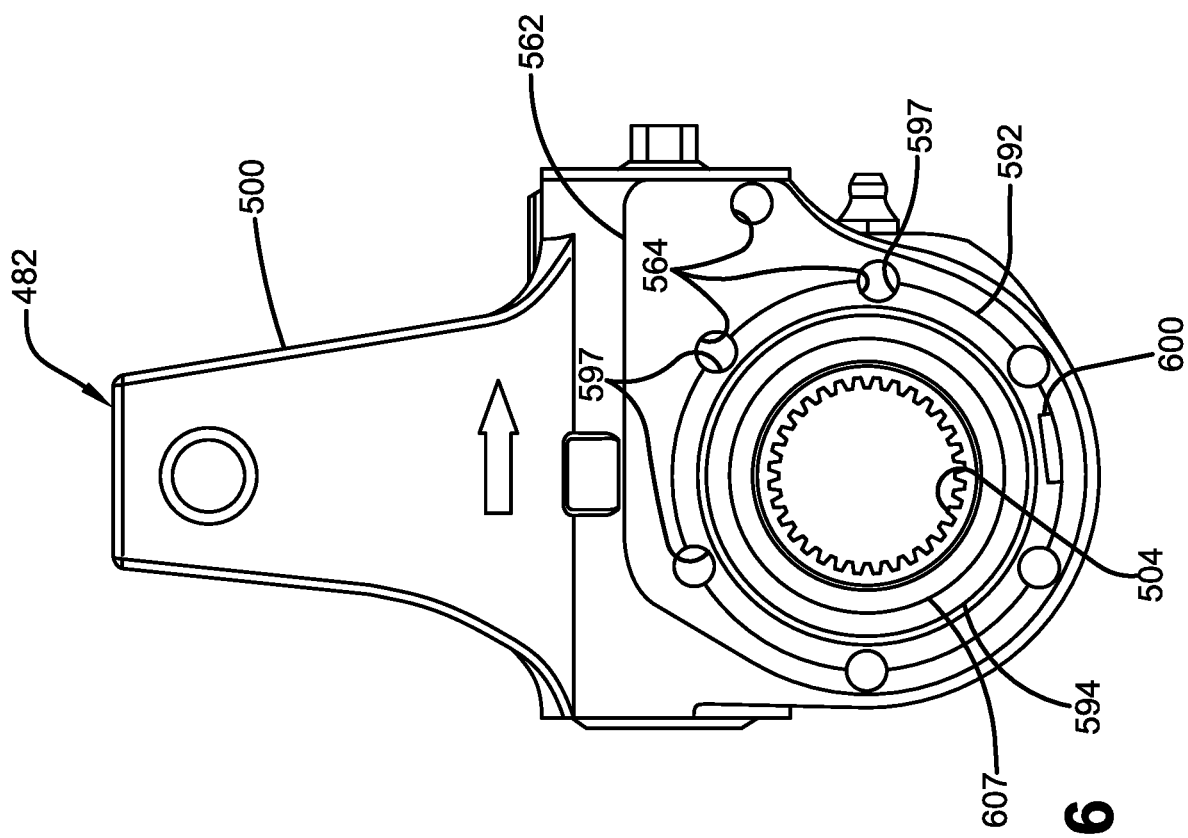
FIG. 6 is an elevational view of a portion of the slack adjuster assembly shown in FIGS. 3-5, showing the slack adjuster connected to components of the interlock assembly and the outboard sealing assembly.

In accordance with an important aspect of the invention, slack adjuster assembly 480 includes an outboard sealing assembly 550 (FIG. 4), an interlock assembly 555 (FIG. 4), and an inboard sealing assembly 580. With particular reference to FIG. 4, outboard sealing assembly 550 includes a gasket or seal 552 and a cover plate 562. Seal 552 may be formed from any suitable material, but more preferably is formed from a polymer, such as Mylar. Seal 552 may have an adhesive coating on one or both of the inboard and outboard sides to attach the seal to body 500 and cover plate 562. Cover plate 562 may be formed from any suitable material, such as metal, by any suitable method. Body 500, seal 552, and cover plate 562 each have a respective plurality of aligned openings 502, 554, 564 for receiving a respective number of fasteners (not shown) to attach the cover plate to the body and form a watertight seal therebetween.

In accordance with another important aspect of the present invention, interlock assembly 555 interconnects cam tube 288 with slack adjuster 482, allowing the cam tube to provide a relatively more robust rotation reference apparatus for an automatic adjustment mechanism (not shown) of the slack adjuster than prior art slack adjuster assemblies, such as those employing reference reaction pin mounted control arms. In particular, interlock assembly 555 includes a control ring 556. Control ring 556 is generally tubular with a central opening 558. Control ring 556 includes an integrally formed fine control gear (not shown) formed in the outer surface of the control ring. Alternatively, control ring 556 may have any other suitable feature, such as a slot or notch or a pawl, as is known. Control ring 556 includes a recess 560 (FIG. 3) formed about opening 558 and extending axially outboard from the inboard side of the control ring. Recess 560 may be formed with a stellate, floral, or any other suitable shape having lobes, petals, extensions, or the like circumferentially arranged about opening 558.

Interlock assembly 555 also includes a tubular crimping ring 601 with a central opening 602. Crimping ring 601 has an inboard portion 603 and an elongated outboard portion 604. Inboard portion 603 has an integrally-formed flange 605 that extends radially outward. Flange 605 has a stellate or floral shape, or any other suitable shape having lobes, petals, extensions, or the like, corresponding to the shape of recess 560 of control ring 556. More specifically, outboard portion 604 of crimping ring 601 is disposed through opening 558 of control ring 556 such that flange 605 of inboard portion 603 is disposed within recess 560. As a result, flange 605 mechanically engages or interacts with recess 560 and control ring 556 to prevent relative rotation between the crimping ring and the control ring.

Control ring 556 and inboard portion 603 of crimping ring 601 are operatively retained within body 500 of slack adjuster 482 by cover plate 562. The control gear of control ring 556 operatively engages a regulator pinion 506 within body 500. Alternatively, control ring 556, having a slot, notch, or pawl, may operatively engage any other suitable mechanism or interface of slack adjuster 482, such as a rack and pinion assembly or a ratchet wheel, as is known. As a result, control ring 556 cooperates with the suitable mechanism or interface to operate the automatic adjustment mechanism of slack adjuster 482.

Interlock assembly 555 also includes a grounding ring 592. Grounding ring 592 is generally tubular with an opening 593. Opening 593 may be located in an off-center manner in grounding ring 592. Alternatively, opening 593 may be located centrally in grounding ring 592. Opening 593 may be formed with a textured surface or have a plurality of integrally formed projections 598 circumferentially arranged about the opening and extending radially inward. The outboard side of grounding ring 592 has a generally stepped or graduated shape extending from the outer surface toward opening 593. In particular, grounding ring 592 may be formed with annular recesses 594, 595 extending axially inboard from the outboard side and arranged in a radially stepped manner from the outer surface toward opening 593. More particularly, recess 595 extends axially inboard farther than recess 594, providing a stepped appearance to the outboard side of grounding ring 592.

Recess 595 of grounding ring 592 allows the grounding ring and crimping ring 601 to be fixedly connected by swaging. In particular, outboard portion 604 of crimping ring 601 is at least partially disposed through opening 593 of grounding ring 592. More particularly, grounding ring 592 is swaged onto outboard portion 604 such that projections 598 of opening 593 are forced into or engage and deform the outboard portion of crimping ring 601. Swaging grounding ring 592 to crimping ring 601 forms a flange 607 (FIG. 3) from outboard portion 604 of the crimping ring. Flange 607 extends radially outward from outboard portion 604 of crimping ring 601 and into recess 595 of the grounding ring. As a result, flange 607 may occupy recess 595 such that the outboard surface of the flange is coplanar with the outboard surface of recess 594. Swaging grounding ring 592 to crimping ring 601 may allow for a small clearance or air gap 591 (FIG. 7) to be formed between the grounding ring and cover plate 562 to provide slack adjuster 482 with a predetermined amount of axial clearance. An annular groove 596 (FIG. 5) is formed in the inboard side of grounding ring 592, extends axially outboard, and corresponds to another annular groove 563 (FIG. 4) formed in the outboard side of cover plate 562 that extends axially inboard. An O-ring 561 may be seated within and between annular grooves 596, 563 such that the O-ring may be compressed when grounding ring 592 is swaged to crimping ring 601. As a result, O-ring 561 provides a seal between cover plate 562 and grounding ring 592, preventing loss of grease and infiltration of water, contaminants, and other road debris while enabling relative rotation between the cover plate and the grounding ring during operation.

Grounding ring 592 may also include a plurality of notches 597 formed in the outer surface of the grounding ring and extending radially inward. Notches 597 correspond to the plurality of aligned openings 502, 554, 564 in body 500 of slack adjuster 482, seal 552, and cover plate 562, respectively, and facilitate access to the fasteners (not shown) disposed within the aligned openings. Grounding ring 592 also includes a projection or tab 600 (FIG. 4) extending axially outboard from the outboard side of the grounding ring adjacent the outer surface and between adjacent notches 597. Alternatively, grounding ring 592 may have multiple tabs 600 in a circumferentially-spaced arrangement such that the tabs are located between adjacent notches 597. Tab 600 may also extend radially outward from the outer surface of the grounding ring but is preferably circumferentially coplanar with the outer surface. Tab 600 provides a more secure connection and prevents relative rotation between grounding ring 592 and other components of interlock assembly 555 as described in more detail below.

Interlock assembly 555 also includes an anchor ring 566 (FIGS. 3, 5, and 7-8). Anchor ring 566 is generally tubular and has an inboard portion 568 and an outboard portion 570. Inboard portion 568 has dimensions that are reduced as compared to outboard portion 570. More specifically, inboard portion 568 has an outer diameter or dimension D1 that is less than an outer diameter or dimension D2 of outboard portion 570. Inboard portion 568 also has an inner diameter or dimension D3 that is less than an inner diameter or dimension D4 of outboard portion 570. Inner dimension D3 of inboard portion 568 allows the inboard portion to be disposed about and connected to inboard end 294 of cam tube 288 by any suitable means, such as a press fit, to prevent relative rotational movement between the cam tube and anchor ring 566 and provide a watertight seal, thereby preventing infiltration of corrosive agents and debris. Inboard portion 568 is arranged about inboard end 294 of cam tube 288 such that outboard portion 570 is disposed about and radially-spaced a distance from at least a portion of cam tube 288. In addition, outer dimension D1 of inboard portion 568 allows the inboard portion to be at least partially disposed within grounding ring 592 such that the inboard surface of the inboard portion contacts the outboard surface of recess 594 and/or the outboard surface of flange 607. More preferably, inboard portion 568 of anchor ring 566 and grounding ring 592 are connected by clearance fit, forming an air gap 567 between the grounding ring and outboard portion 570. Air gap 567 provides an outlet for excess pressurized air and/or grease that cam tube 288 and slack adjuster 482 may be exposed to when the cam tube is filled with grease using certain equipment, such as a high pressure or pneumatic grease gun (not shown).

Outboard portion 570 of anchor ring 566 may include a plurality of tabs 572 extending radially outward in a circumferentially-spaced arrangement. Tabs 572 are generally arcuate or semi-circular but may have any suitable shape. Each of tabs 572 has a notch 573 (FIG. 5) formed adjacent the radial end of the tab and shaped to receive a head of a respective one of fasteners 250. Fasteners 250 may be slidably disposed within notches 573 such that the fasteners are restrained and prevented from rotating, thereby facilitating the connection of cam tube bracket 291 to beam sidewall 293. In addition, disposing fasteners 250 within notches 573 prevents relative rotation between anchor ring 566 and beam sidewall 293. More specifically, the press fit connection between inboard portion 568 of anchor ring 566 and cam tube 288, a friction connection between the cam tube and cam tube bracket 291, and the engagement of fasteners 250 with notches 573 prevent vibration of the heavy-duty vehicle during operation from causing improper indexing of the rotation of cam shaft 286. Thus, anchor ring 566 with notches 573 provides a relatively more robust rotation reference mechanism than prior art slack adjuster assemblies, such as those employing reference reaction pin mounted control arms.

Figure 7:
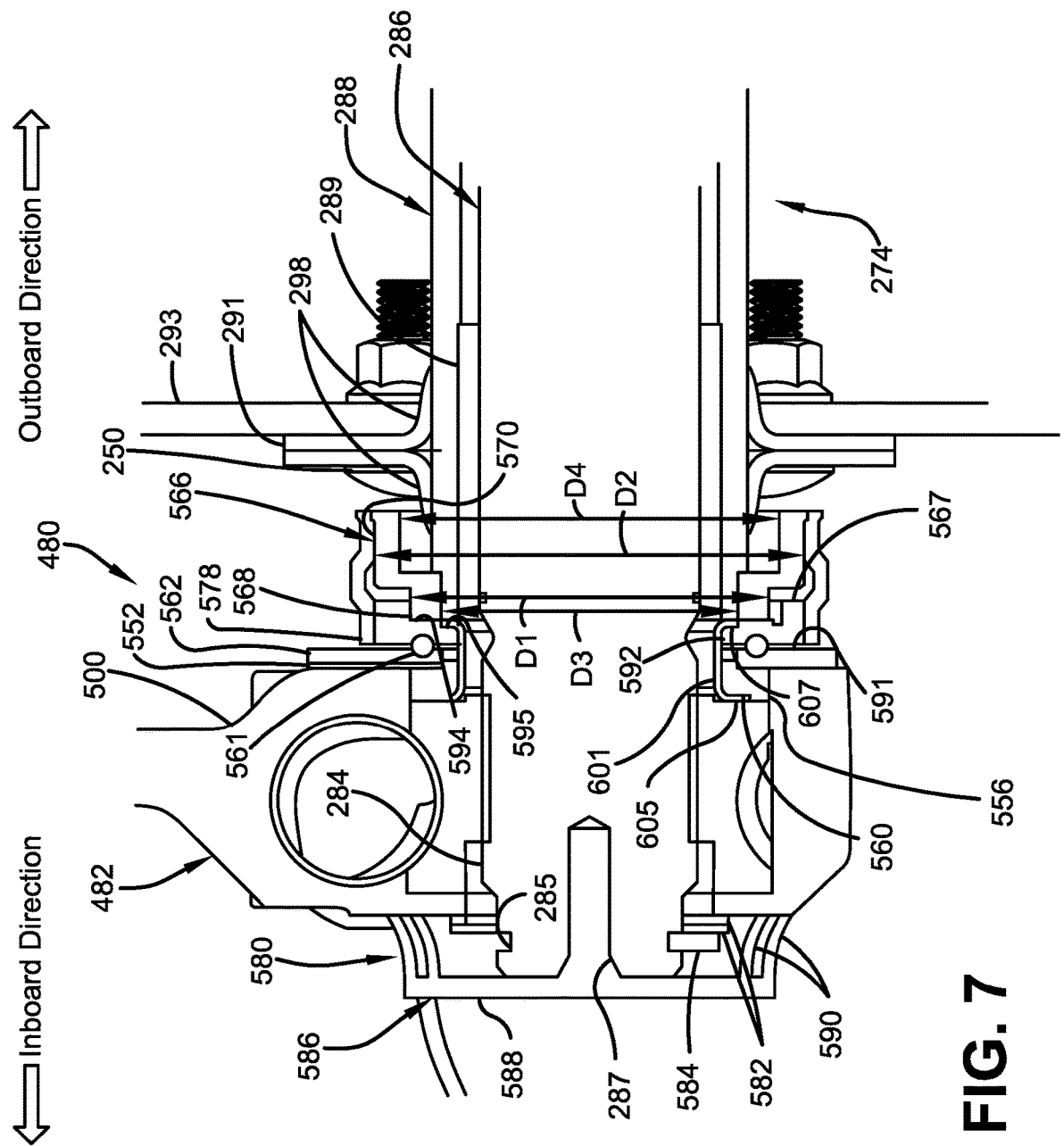
FIG. 7 is a fragmentary elevational view, in section, of the exemplary embodiment slack adjuster assembly shown in FIG. 3, showing the interlock assembly with an alternative anchor ring.
Figure 8:
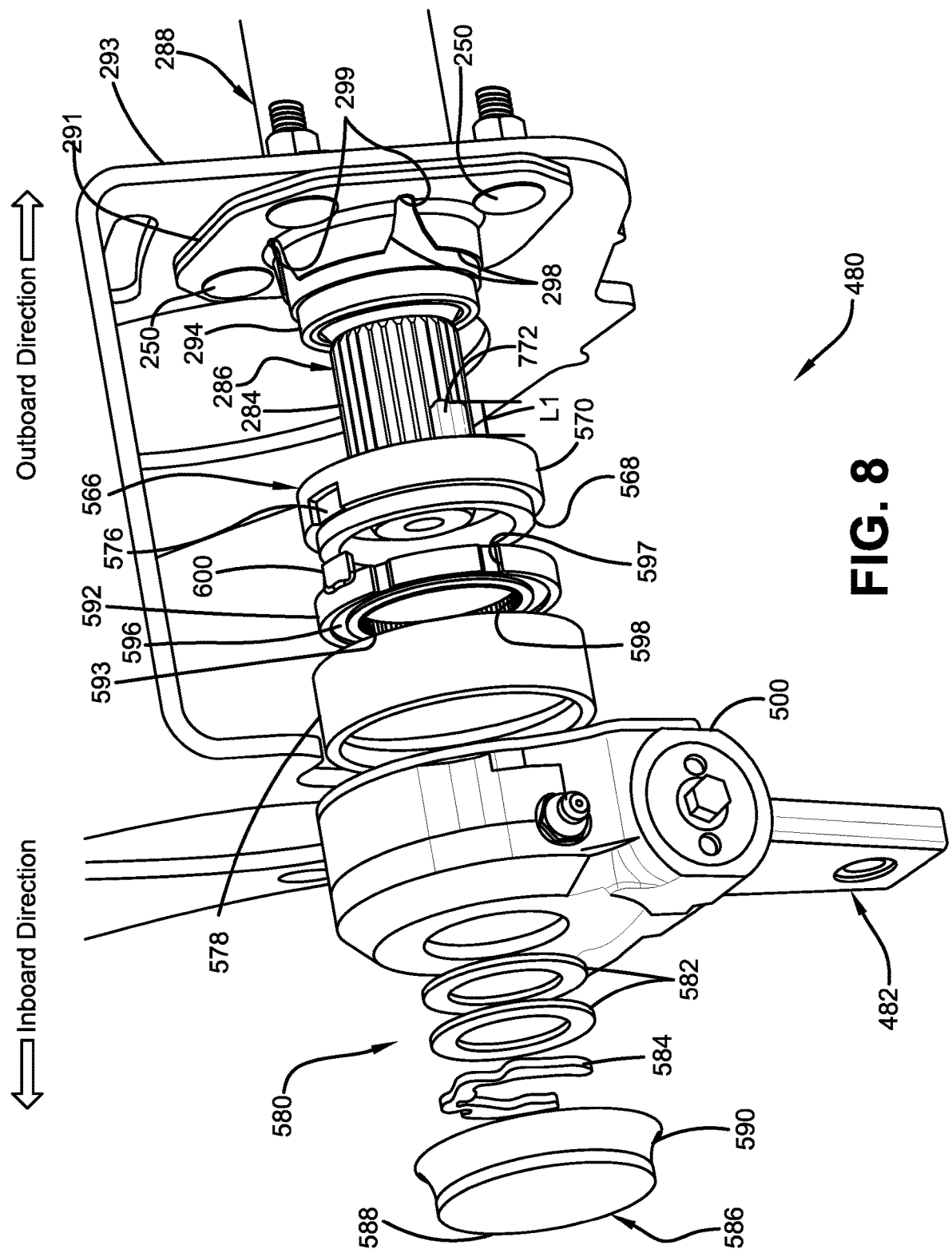
FIG. 8 is an exploded fragmentary perspective view of a portion of the slack adjuster assembly shown in FIG. 7 with the alternative anchor ring, showing the inboard sealing assembly, slack adjuster, and components of the interlock assembly, and the outboard sealing assembly integrated into the braking system.

Alternatively, and with specific reference to FIGS. 7-8, anchor ring 566 may include one or more circumferentially-spaced projections 772 (FIG. 8) extending axially outboard from the anchor ring. More preferably, outboard portion 570 may have a pair of projections 772 circumferentially-spaced about 180° from one another. Each of projections 772 extend axially outboard from outboard portion 570 a distance L1 such that at least a portion of the projections may be disposed between or engage tabs 298 of cam tube bracket 291. More specifically, each of projections 772 may be slidably disposed within a respective notch 299 formed between a respective pair of tabs 298 of cam tube bracket 291. The arrangement of projections 772 disposed within respective notches 299 prevents relative rotation between anchor ring 566 and beam sidewall 293. In particular, the press fit connection between inboard portion 568 of anchor ring 566 and cam tube 288, the friction connection between the cam tube and cam tube bracket 291, and the engagement of projections 772 within notches 299 of cam tube bracket 291 prevent vibration of the heavy-duty vehicle during operation from causing improper indexing of the rotation of cam shaft 286. Thus, anchor ring 566 with projections 772 provides a relatively more robust rotation reference mechanism than prior art slack adjuster assemblies, such as those employing reference reaction pin mounted control arms.

Figure 9:
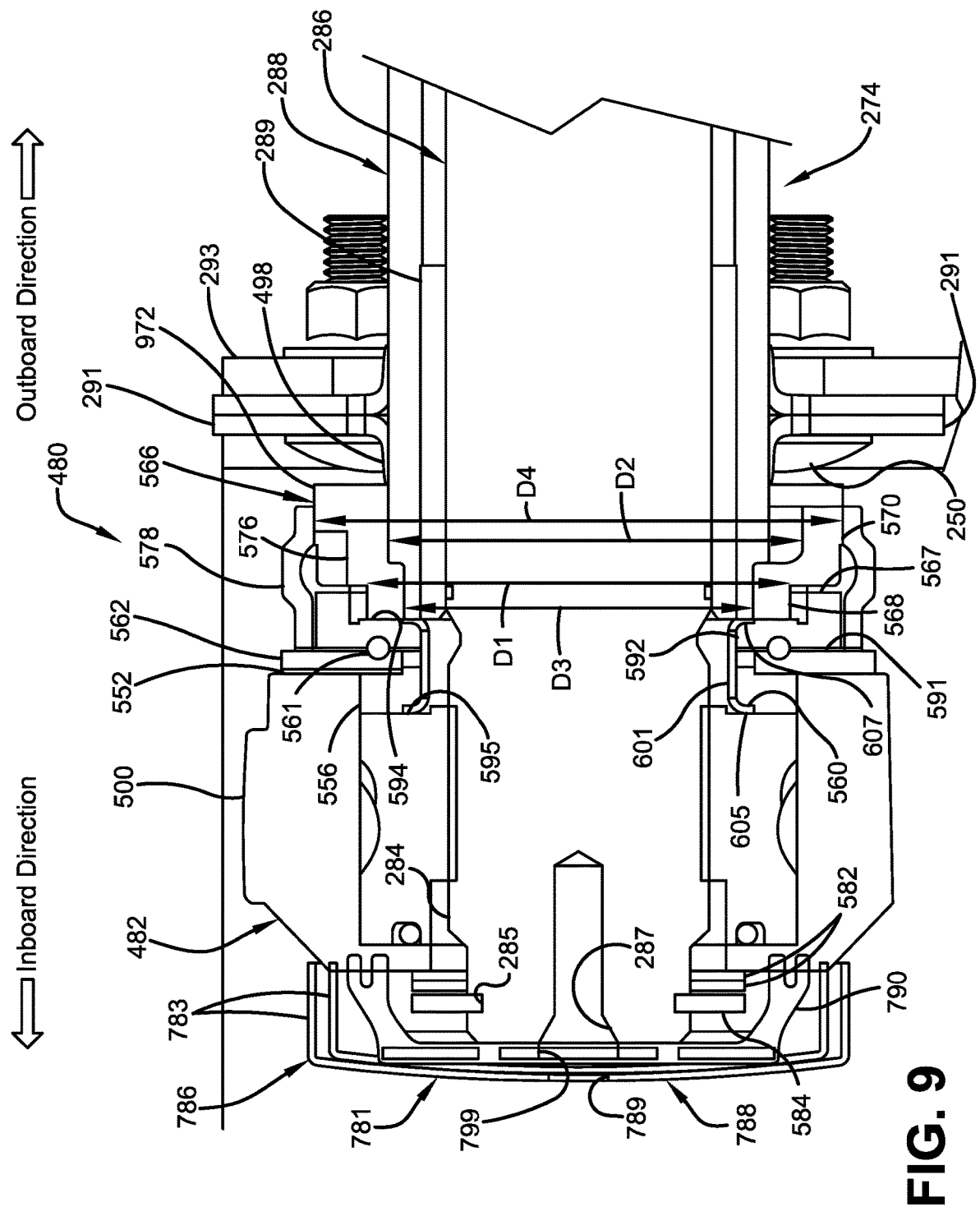
FIG. 9 is a fragmentary bottom view, in section, of the exemplary embodiment slack adjuster assembly shown in FIG. 3, showing the interlock assembly with another alternative anchor ring and an alternative cam tube bracket notch and showing the inboard sealing assembly with an alternative cap.
Figure 10:
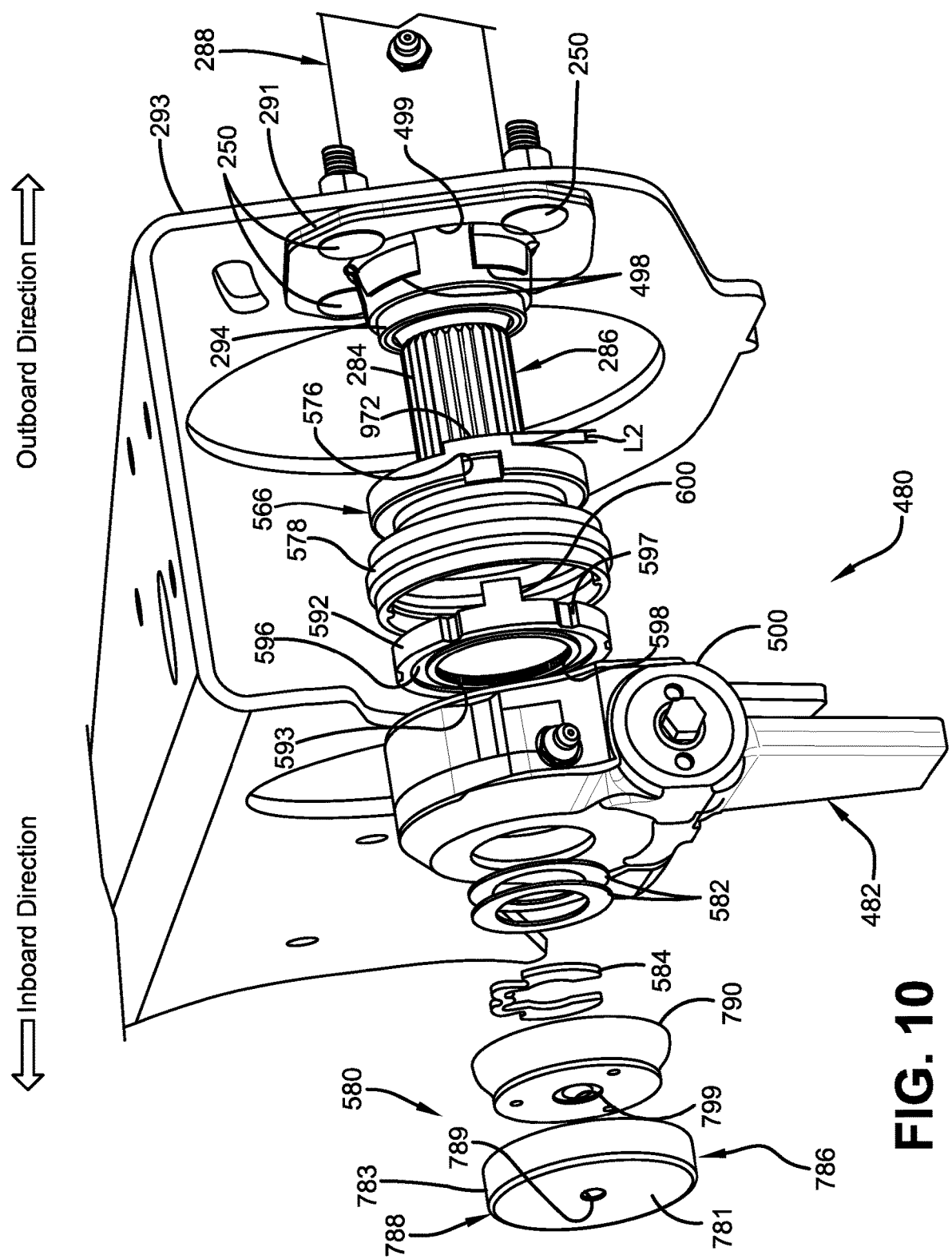
FIG. 10 is an exploded fragmentary perspective view of a portion of the slack adjuster assembly shown in FIG. 9, showing the inboard sealing assembly with the alternative cap, the slack adjuster, components of the interlock assembly with the other alternative anchor ring and alternative cam tube bracket notch, and the outboard sealing assembly integrated into the braking system.

In the alternative, and with specific reference to FIGS. 9-10, anchor ring 566 may include a large projection or tab 972, best seen in FIG. 10, extending axially outboard from the anchor ring. In addition, cam tube bracket 291 may be formed with at least a pair of adjacent tabs 498 shaped to provide an enlarged notch 499 (FIG. 10) complementary to tab 972. Tab 972 extends axially outboard a distance L2 from outboard portion 570 such that at least a portion of the tab may be disposed between the adjacent tabs 498 of cam tube bracket 291. More specifically, tab 972 may be slidably disposed within notch 499 formed between the adjacent tabs 498 of cam tube bracket 291. The arrangement of tab 972 disposed within notch 499 prevents relative rotation between anchor ring 566 and beam sidewall 293. In particular, the press fit connection between inboard portion 568 of anchor ring 566 and cam tube 288, the friction connection between the cam tube and cam tube bracket 291, and the engagement of tab 972 within notch 499 of cam tube bracket 291 prevent vibration of the heavy-duty vehicle during operation from causing improper indexing of the rotation of cam shaft 286. Thus, anchor ring 566 with tab 972 and cam tube bracket 491 with notch 499 provide a relatively more robust rotation reference mechanism than prior art slack adjuster assemblies, such as those employing reference reaction pin mounted control arms.

Outboard portion 570 of anchor ring 566 also includes one or more notches or recesses 576 (FIG. 5, 8-10) (only one shown) formed in the outer surface of the outboard portion adjacent inboard portion 568 and extending radially inward. It is also contemplated that, in the alternative configuration including tab 972, described above, a single recess 576 may be formed such that the recess aligns with and extends outboardly along the tab. Recesses 576 may be formed such that the recesses are coplanar and continuous with the outer surface of inboard portion 568. Recesses 576 correspond to and receive respective tabs 600 of grounding ring 592. Mechanical engagement between tabs 600 and recesses 576 provides a more secure connection and prevents relative rotation between grounding ring 592 and anchor ring 566. As a result, cam tube 288, together with the friction connection between the cam tube and cam tube bracket 291, provides a robust, non-rotating anchor, or rotation reference mechanism, for control ring 556, which is important for the proper operation of the automatic adjustment mechanism of slack adjuster 482.

In accordance with another important aspect of the present invention, outboard sealing assembly 550 includes a generally tubular sealing ring 578. Sealing ring 578 is formed from any suitable material, such as an elastomer, and is disposed about grounding ring 592 and at least part of outboard portion 570 of anchor ring 566. Sealing ring 578 provides an additional barrier that prevents loss of grease and infiltration of water, corrosive agents, and debris into slack adjuster 482 and cam tube 288 on the outboard side of the slack adjuster. It is also contemplated that sealing ring 578 may be attached to grounding ring 592 using a clamp ring (not shown) and/or to outboard portion 570 of anchor ring 566 by an interference slip fit connection. The interference slip fit connection between sealing ring 578 and outboard portion 570 facilitates assembly while providing a purge point in outboard sealing assembly 550 to allow grease to infiltrate between tab 600 and recess 576, thereby preventing grease over-pressurization during assembly and providing lubrication to protect components from wear during operation. In the alternative, sealing ring 578 may be attached to grounding ring 592 and outboard portion 570 of anchor ring 566 using one or more clamping rings (not shown). It is also contemplated that sealing ring 578 may include a pin hole opening (not shown) extending through the sealing ring and in fluid communication with air gap 567. In this configuration, the pinhole cooperates with air gap 567 to provide an outlet for excess pressurized air and/or grease that cam tube 288 and slack adjuster 482 may be exposed to when the cam tube is filled with grease using certain equipment, such as a high pressure or pneumatic grease gun (not shown).

In accordance with yet another important aspect of the present invention, interlock assembly 555 cooperates with outboard sealing assembly 550 to operatively connect cam tube 288 to slack adjuster 482 forming a continuous pathway for lubrication of inboard splined end 284 of camshaft 286. In particular, the connections between cam tube 288, anchor ring 566, grounding ring 592, crimping ring 601, control ring 556, and cover plate 562, described above, form a continuous pathway that allows grease from the cam tube to move between the cam tube and slack adjuster 482, such that grease may purge between the respective splines of inboard splined end 284 of camshaft 286 and worm wheel 504 of the slack adjuster. Thus, cam tube 288 and slack adjuster assembly 480 form a continuous grease chamber or pathway between the cam tube and internal components of slack adjuster 482 that maintains a reservoir for lubricating inboard splined end 284 of camshaft 286.

In accordance with yet another important aspect of the present invention, inboard sealing assembly 580 includes one or more washers 582 disposed about inboard splined end 284 of camshaft 286. Washers 582 may be formed from any suitable material, such as steel, and disposed such that the washers are in contact with, and may be operatively connected to, the inboard side of body 500 of slack adjuster 482. Washers 582 may have varying thicknesses to account for variability in dimensions of other components disposed inboardly of outboard end 292 of camshaft 286. Washers 582 limit axial movement of camshaft 286 to less than about 0.060 inches (0.15 cm), more preferably between about 0.010 in. (0.025 cm) to about 0.045 in. (0.11 cm), reducing wear on, and increasing the service life of, bearings 289 and seals 297 of cam tube assembly 274. It is also contemplated that washers 582 may be formed with one or more notches extending radially-outward from the inner diameter in order to facilitate the passage of grease through the washer. A retention ring 584 operatively engages groove 285 of inboard splined end 284 of camshaft 286 to secure the camshaft in slack adjuster 482, prevent outboard movement of the camshaft, and, in turn, prevent the splines of the camshaft from disengaging splines of worm wheel 504 within the slack adjuster. Retention ring 584 may also retain washers 582 against body 500 about camshaft 286. Alternatively, washers 582 may capture or retain an inboard cover plate (not shown), similar to cover plate 562, against body 500.

Inboard sealing assembly 580 also includes an outer cap 586. Cap 586 may be formed from any suitable material or combination of materials, such as rubber, metal, or plastic. In particular, cap 586 may include a metal or composite plate 588 attached using any suitable means to one or more annular, conical or frustoconical seals 590 extending from the plate. Cap 586 may be attached to slack adjuster 482 and/or camshaft 286 using any suitable means. More preferably, cap 586 includes an opening (not shown) in plate 588. The opening aligns with opening 287 of inboard splined end 284 of camshaft 286. A fastener (not shown) is passed through the opening in plate 588 and is received in opening 287 of inboard splined end 284, thereby securing cap 586 to camshaft 286.

Alternatively, and with specific reference to FIGS. 9-10, inboard sealing assembly 580 may include a cap 786 similar in construction and arrangement to cap 586. Cap 786 may be formed from any suitable material or combination of materials, such as rubber, metal, or plastic. In particular, cap 786 may include a metal or composite plate 788 attached to an annular or frusto-conical seal 790. Plate 788 may include a circular base 781 and one or more integrally-formed outboardly extending flanges 783. Plate 788 may be disposed over seal 790 such that flange 783 is spaced a radial distance outwardly of the seal. Flange 783 also extends outboardly from base 781 a sufficient distance such that the outer perimeter or edge of the flange may be adjacent to, in contact and forming an interface with, connected to, or mechanically engaged with body 500, protecting seal 790 from impacts. Base 781 of plate 788 and seal 790 include aligned openings 789, 799, respectively that correspond to and are aligned with opening 287 of inboard splined end 284 of camshaft 286. A fastener (not shown) is passed through openings 789, 799 in plate 788 and seal 790, respectively, and is received in opening 287 of inboard splined end 284, thereby securing cap 786 to camshaft 286.

Seals 590, 790 generally form an interface with the inboard side of body 500 or, alternatively, the inboard cover plate, of slack adjuster 482. More particularly, seals 590, 790 may abut, mechanically engage with, or be attached to the inboard side of body 500, or, alternatively, the inboard cover plate, of slack adjuster 482 by any suitable means, such as adhesive. Seals 590, 790 allow relative rotational movement between cap 586, 786, respectively, and body 500 while maintaining a sliding seal during indexing of camshaft 286. Thus, inboard sealing assembly 580 with seals 590, 790 and caps 586, 786, respectively, prevents loss of grease and infiltration of water, corrosive agents, and debris into slack adjuster 482 and cam tube 288 on the inboard side of the slack adjuster while providing a purge point for excess or over-pressurized grease to escape.

During assembly, camshaft 286 may be disposed through brake spider 246, beam sidewall 293, and cam tube bracket 291 such that S-cam 290 is disposed outboardly of the brake spider. Cam tube 288 may then be disposed over camshaft 286. A portion of interlock assembly 555 and outboard sealing assembly 550 may then be attached to body 500 of slack adjuster 482. In particular, crimping ring 601 may be slidably disposed through opening 558 of control ring 556 such that flange 605 engages recess 560. Control ring 556 and crimping ring 601 may then be inserted into slack adjuster 482. Seal 552 and cover plate 562 may then be disposed about crimping ring 601 and connected to body 500 of slack adjuster 482. O-ring 561 and grounding ring 592 may then be disposed about outboard portion 604 of crimping ring 601. Grounding ring 592 may then be swaged onto crimping ring 601, fixedly connecting the grounding ring to the crimping ring and forming flange 607. Sealing ring 578 may be positioned over and about grounding ring 592. Anchor ring 566 may then be disposed over camshaft 286 and about inboard end 294 of cam tube 288 in a press fit manner to connect inboard portion 568 of the anchor ring to the cam tube. Slack adjuster 482 may then be disposed about and operatively engage the inboard splined end 284 of camshaft 286 such that grounding ring 592 is disposed about inboard end 568 of anchor ring 566 and such that tab 600 of the grounding ring is disposed within recess 576 of outboard end 570. Sealing ring 578 may then be repositioned about grounding ring 592 and a portion of outboard end 570 of anchor ring 566 and, alternatively, secured using one or more clamping rings.

Inboard sealing assembly 580 may be installed on and over inboard splined end 284 of camshaft 286 to create, with outboard sealing assembly 550, a 360° sealing structure on both the inboard and outboard sides of slack adjuster 482. Alternatively, inboard sealing assembly 580 may be installed on and over a portion of the inboard side of body 500 over inboard splined end 284 of camshaft 286 to create a 360° sealing structure. Grease may then be forced into cam tube 288 through a port (not shown) on the cam tube, filling the cam tube, slack adjuster 482, and inboard sealing assembly 580, such that excess grease purges from the interface between the inboard sealing assembly and body 500 of the slack adjuster, between grounding ring 592 and anchor ring 566 into air gap 567, and/or between sealing ring 578 and anchor ring 566. It is also contemplated that grease may purge through air gap 567 and a pinhole opening (not shown) formed through sealing ring 578. Thus, the continuous grease pathway, or encapsulation, formed between cam tube 288 and slack adjuster 482, in addition to interlock assembly 555 and outboard and inboard sealing assemblies 550, 580, respectively, prevent infiltration of water, corroding agents, and debris into the splines of camshaft 286 and the slack adjuster, retention ring 584, washer 582, as well as bearings 289 of the cam tube. As a result, slack adjuster 482 requires less maintenance and has an extended service life.

Slack adjuster assembly 480, cam shaft 286, and cam tube 288 may then be mounted to the heavy-duty vehicle. Fasteners 250 may be placed through cam tube bracket 291. Cam tube bracket 291 may be slidably disposed about S-cam 290 and outboard end 296 of cam tube 288. Cam tube bracket 291 may then be manipulated, such as by sliding, down cam tube 288 until the heads of fasteners 250 are disposed in notches 573 of tabs 572 of anchor ring 566. Alternatively, cam tube bracket 291 may be manipulated, such as by sliding, down cam tube 288 until projections 772, 972 of outboard portion 570 of anchor ring 566 are disposed within notches 299, 499 between tabs 298, 498, respectively, of the cam tube bracket. S-cam 290 and outboard end 296 of cam tube 288 may then be disposed through brake spider 246. Fasteners 250 may then be disposed through beam sidewall 293 and tightened to secure cam tube 288 within cam tube bracket 291 and secure the bracket on the cam tube to the beam sidewall to prevent rotation.

Thus, slack adjuster assembly 480, according to the present invention, provides a rotation reference mechanism that is relatively more robust than prior art slack adjuster assemblies, such as those employing reference reaction pin mounted control arms, that utilizes interlock assembly 555 with press fit connection between anchor ring 566 and cam tube 288 as well as the engagement between fasteners 250 and notches 573, or, alternatively, between projections 772, 972 and notches 299, 499 of cam tube bracket 291, to prevent vibration of the heavy-duty vehicle from causing improper indexing of the rotation of cam shaft 286. Moreover, slack adjuster assembly 480 with inboard and outboard sealing assemblies 580, 550, respectively, provides a 360° seal on the inboard and outboard sides of slack adjuster 482, protects index referencing components, and creates a continuous pathway between cam tube 288 and the slack adjuster for lubricating the splines of inboard splined end 284 of camshaft 286 and other components of the slack adjuster and braking system 272, thereby increasing the maintenance interval and service life of the slack adjuster and reducing heavy-duty vehicle down time.

It is contemplated that slack adjuster assemblies 280, 480 of the present invention could be formed from any suitable material, including but not limited to composites, metal, and the like, without changing the overall concept or operation of the present invention. It is also contemplated that slack adjuster assemblies 280, 480 of the present invention could be utilized in braking systems on heavy-duty vehicles having more than one axle and/or one or more than one wheel per wheel end assembly, without changing the overall concept or operation of the present invention. It is further contemplated that slack adjuster assemblies 280, 480 of the present invention could be utilized with all types of heavy-duty vehicle drum braking systems without changing the overall concept or operation of the present invention.

It is contemplated that different arrangements and materials of outboard sealing assemblies 350, 550; interlock assemblies 355, 555; and inboard sealing assemblies 380, 580 other than those shown and described, could be utilized without changing the overall concept or operation of the present invention, so long as they achieve a more robust rotation reference mechanism; a 360° seal on both the inboard and outboard sides of slack adjusters 282, 482; and a grease pathway continuous between cam tube 288 and the slack adjuster. It is also contemplated that other methods and order of assembly could be utilized to assemble camshaft 286; cam tube 288; slack adjusters 282, 482; interlock assemblies 355, 555; outboard sealing assemblies 350, 550; and inboard sealing assemblies 380, 580 without changing the overall concept or operation of the present invention.

Accordingly, slack adjuster assemblies 280, 480 of the present invention are simplified; provide an effective, safe, inexpensive, and efficient structure and method, which achieve all the enumerated objectives; provide for eliminating difficulties encountered with prior art slack adjusters; and solve problems and obtain new results in the art.

In the foregoing description, certain terms have been used for brevity, clarity, and understanding, but no unnecessary limitations are to be implied therefrom beyond the requirements of the prior art because such terms are used for descriptive purposes and are intended to be broadly construed. Moreover, the description and illustration of the invention is by way of example, and the scope of the invention is not limited to the exact details shown or described.

Having now described the features, discoveries, and principles of the invention; the manner in which the slack adjuster assemblies are used and installed; the characteristics of the construction, arrangement, and method steps; and the advantageous, new, and useful results obtained, the new and useful structures, devices, elements, arrangements, process, parts, and combinations are set forth in the appended claims.

What is claimed is:

1. A slack adjuster assembly for use with a heavy-duty vehicle drum brake system, the slack adjuster assembly comprising:
    a slack adjuster;
    a cam tube assembly; and
    an interlock assembly, said interlock assembly being disposed on an outboard side of said slack adjuster and interconnecting said cam tube assembly with the slack adjuster, the interlock assembly having a plurality of components;
    wherein at least one of said plurality of components of the interlock assembly and a component of the cam tube assembly cooperate to form a rotation reference mechanism for indexing of an automatic adjustment mechanism of said slack adjuster
    the at least one of the plurality of components of the interlock assembly being at least partially disposed about said component of the cam tube assembly.

2. The slack adjuster assembly of claim 1 further comprising an inboard sealing assembly, said inboard sealing assembly engaging an inboard side of said slack adjuster to form a 360-degree interface; and
    an outboard sealing assembly, said outboard sealing assembly engaging said outboard side of said slack adjuster to form a 360-degree interface.

3. The slack adjuster assembly of claim 2, said component of said cam tube assembly comprising a cam tube.

4. The slack adjuster assembly of claim 3, said cam tube, said interlock assembly, and said inboard and outboard sealing assemblies cooperating to form a continuous grease pathway between the cam tube and said slack adjuster.

5. The slack adjuster assembly of claim 3, said at least one of said plurality of component of said interlock assembly having a dimple, said dimple mechanically engaging a complementary recess formed in said cam tube to prevent relative rotation between the component and the cam tube.

6. The slack adjuster assembly of claim 5, said interlock assembly further comprising a second component of said plurality of components, said second component being at least partially retained within a body of said slack adjuster and mechanically engaged with said component of the interlock assembly and an automatic adjustment mechanism of the slack adjuster.

7. The slack adjuster assembly of claim 3, said cam tube assembly further comprising a bracket having a plurality of fasteners, said cam tube being disposed through said bracket;
    wherein said at least one of said plurality of components of said interlock assembly engages at least a portion of a respective one of said plurality of fasteners to prevent relative rotation between said cam tube assembly and said at least one component of said interlock assembly.

8. The slack adjuster assembly of claim 3, said cam tube assembly further comprising a bracket having a plurality of notches, said cam tube being disposed through said bracket;
    wherein said at least one of said plurality of components of said interlock assembly engages a respective one of the plurality of notches to prevent relative rotation between said cam tube assembly and said at least one component of said interlock assembly.

9. A slack adjuster assembly for use with a heavy-duty vehicle drum brake system, the slack adjuster assembly comprising:
    a slack adjuster;
    a cam tube assembly; and
    an inboard sealing assembly and an outboard sealing assembly;
    wherein said inboard sealing assembly engages an inboard side of said slack adjuster to completely enclose a central aperture of the slack adjuster and form a 360-degree interface with the inboard side of the slack adjuster, and said outboard sealing assembly engages an outboard side of said slack adjuster to form a 360-degree interface.

10. The slack adjuster assembly of claim 9 further comprising an interlock assembly, said interlock assembly interconnecting said cam tube assembly with said slack adjuster to form a rotation reference mechanism for indexing of an automatic adjustment mechanism of the slack adjuster.

11. The slack adjuster assembly of claim 10, said cam tube assembly, said interlock assembly, and said inboard and outboard sealing assemblies cooperating to form a continuous grease pathway between the cam tube assembly and said slack adjuster.

12. The slack adjuster assembly of claim 10, said inboard sealing assembly further comprising a cap having an outboardly-extending seal.

13. The slack adjuster assembly of claim 12, said cap further comprising a plate, said plate extending radially outward of said seal and having an outboardly-extending flange, said flange being radially spaced from the seal and forming an interface with said inboard side of said slack adjuster.

14. The slack adjuster assembly of claim 10, said outboard sealing assembly further comprising a flexible boot, said boot being outboardly of and forming an interface with the outboard side of said slack adjuster;
   wherein the boot is disposed about at least a portion of said interlock assembly.

15. The slack adjuster assembly of claim 14, said outboard sealing assembly further comprising a cover plate, said cover plate also comprising said outboard side of said slack adjuster; and
   a seal, said seal being attached between the slack adjuster and the cover plate.

16. The slack adjuster assembly of claim 15, said boot forming an interface with said cover plate.

17. A slack adjuster assembly for use with a heavy-duty vehicle drum brake system, the slack adjuster assembly comprising:
   a slack adjuster;
   a cam tube assembly; and
   means for forming a continuous grease pathway between said cam tube assembly and said slack adjuster.

18. The slack adjuster assembly of claim 17, said cam tube assembly further comprising a cam tube.

19. The slack adjuster assembly of claim 18, said means further comprising an interlock assembly, said interlock assembly interconnecting said cam tube assembly with said slack adjuster to form a rotation reference mechanism for indexing of an automatic adjustment mechanism of the slack adjuster.

20. The slack adjuster assembly of claim 19, said means further comprising an inboard sealing assembly, said inboard sealing assembly engaging an inboard side of said slack adjuster to form a 360-degree interface.

21. The slack adjuster assembly of claim 20, said means further comprising an outboard sealing assembly, said outboard sealing assembly engaging said outboard side of said slack adjuster to form a 360-degree interface.

* * * * *